Dec. 15, 1942.   S. G. LEONARD   2,305,264
ELECTRICAL APPARATUS FOR INDICATING AND RECORDING
THE CHARACTERISTICS OF SURFACES
Filed Aug. 29, 1939   3 Sheets-Sheet 1

Inventor
Stuart G. Leonard
by Wright, Brown, Quinby & May
Attys.

Dec. 15, 1942. S. G. LEONARD 2,305,264
ELECTRICAL APPARATUS FOR INDICATING AND RECORDING
THE CHARACTERISTICS OF SURFACES
Filed Aug. 29, 1939 3 Sheets-Sheet 2

Inventor
Stuart G. Leonard
by Wright, Brown,
Quinby & May Attys.

Patented Dec. 15, 1942

2,305,264

UNITED STATES PATENT OFFICE 2,305,264

ELECTRICAL APPARATUS FOR INDICATING AND RECORDING THE CHARACTERISTICS OF SURFACES

Stuart G. Leonard, Springfield, Vt., assignor to The Fellows Gear Shaper Company, Springfield, Vt., a corporation of Vermont Application August 29, 1939, Serial No. 292,433

7 Claims. (Cl. 73—51)

The purpose of this invention is to enable records as well as indications to be made of the condition of surfaces; i. e., the approximations of an actual surface on a specific article to a prescribed condition and the aberrations, if any, of such actual surface from the prescribed or standard surface. It is a part of this object to make the records in such a way as to correlate the records with definite portions of the surface being measured, and to make and record the measurements on an enlarged scale so that errors not apparent to the unaided senses of the observer, and their magnitude, will be recorded for future reference.

While evidently the principles of the invention are applicable to making such measurements and records of a wide variety of curved and other surfaces, one large and important field of use is for recording the characteristics of gear tooth faces, cams and other machine elements in which accuracy of surface with reference to some prescribed surface or curve is important, and it is necessary to know whether, and in what manner and to what extent, the surface of the machine element deviates from the standard.

The embodiment of the invention here illustrated has been designed for combined use with a preexisting machine for testing the accuracy of involute gear teeth and other elements having surfaces of involute curvature. Consequently, in the interest of clarity and conciseness, I will in the following specification explain the invention in terms of its combination with such machine and use for recording the measurements made by that machine; but without intent to imply a limitation of the invention or the scope in which protection is claimed to such specific combination and use.

The invention comprises means for effecting relative movement between a record chart and a marking instrument proportional to movements in a given direction between the surface being measured and a contact point or feeler which bears on such surface with a yieldable pressure, and the combination with such means of electrical equipment organized to produce relative movement between the chart and marking instrument in a direction transverse to that of the relative movement previously referred to, through distances proportional to movements of the contact point or feeler caused by portions of the surface being measured lying at one side or the other of the path of relative movement followed in the course of taking measurements (in other words, by high or low points of such surface). It further comprises new combinations of known elements of mechanical and electrical equipment organized to produce the effects referred to. For a clear understanding of such combinations and the generic principles underlying them, a description in detail of a specific embodiment of them is necessary. Such description follows with reference to illustrative drawings.

In the drawings—

Like reference characters designate the same parts wherever they occur in all the figures.

Figure 1:
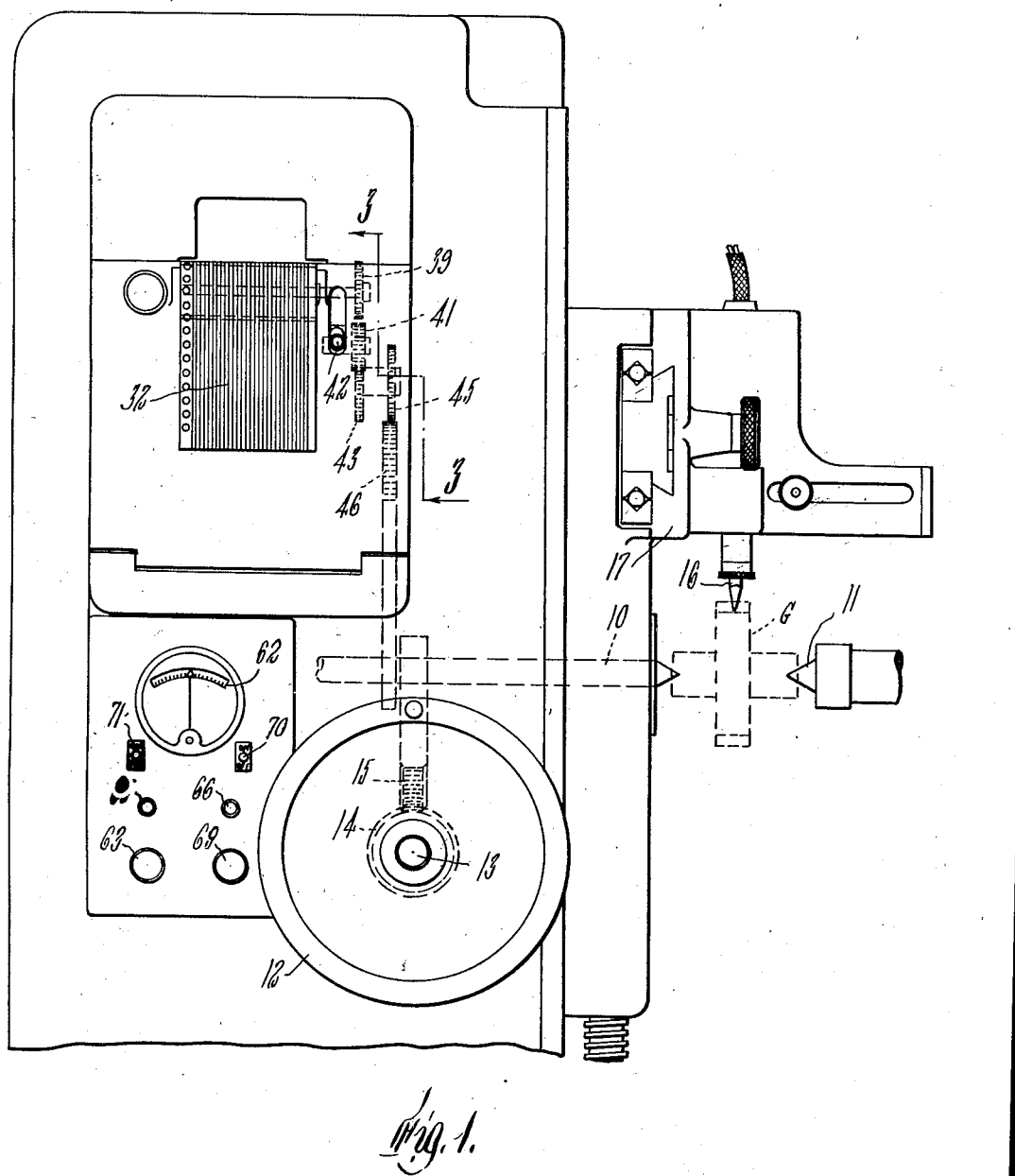
Fig. 1 is a side elevation of a portion of a commercial machine designed for testing involute curves with which has been combined recording means in accordance with this invention.

The machine here diagrammatically represented is made in accordance with the invention of Edward W. Miller disclosed in his patent entitled Involute measuring machine, No. 2,171,589, dated September 5, 1939. The gear G having involute teeth, or other test piece possessing a curved surface of involute curvature, is mounted between a spindle 10 and supporting center 11, in coupled connection with the spindle to turn therewith about the axis of the base circle of its involute curve or curves. The spindle and cooperating center are suitably supported by the base structure of the machine, and the spindle is rotated by suitable means, such as a hand wheel 12, mounted on a shaft 13 which carries a worm 14 meshing with a gear segment 15 secured to the spindle 10. A pointer or feeler 16, having a contact point for engagement with the surface being measured, is mounted on a slide or carriage 17 which travels on the base structure in a straight path transverse to the axis of the spindle and at one side thereof, and the feeler projects from the slide toward the location of the test piece to the extent that is contact point travels in a line tangent to the base circle of the test piece. Movement at a speed equal to the linear travel of the base circle circumference is imparted to the carriage 17 (and therewith to the feeler) from the spindle through an arm 18 secured to the spindle 10, a main slide or drive slide 19, mounted to travel on the base structure in a path parallel to that of carriage 17, and a ratio lever 20 pivoted to the base structure. Arm 18 carries a cam element 21, corresponding to a gear tooth, which engages abutment faces 22 and 23, corresponding to the faces of rack teeth, on the drive slide.

The slide 19 and carriage 17 are engaged with the ratio lever by means which permit slip transverse to the axis of the lever while transmitting motion to and from the lever respectively, here illustratively shown as a pin 24 on the drive slide occupying a slot 25 in one arm of the lever, and a pin 26 on the carriage occupying a slot 27 in the other arm of the lever. The distance of the path in which the center of pin 24 travels, from the fulcrum axis of the lever 20, is equal to the radius of the pitch circle on which the cam 21 cooperates with the slide 19; and the distance between the lever fulcrum and the path in which the center of pin 26 travels is equal to the base circle radius of the test piece. Hence whenever the test piece is rotated the feeler point travels at the same linear speed as the base circle circumference; and, if the test piece is adjusted on the spindle with the advancing side of the tooth in contact with the feeler, rotation of the test piece causes such tooth face to slide past the feeler without causing any movement thereof relatively to its carriage when the tooth face is a true and accurate involute without surface irregularities. (Provisions for adjustment of the feeler and pin 26 to gears of different base circle diameters contained in the commercial machine, and shown in said Miller patent, are omitted from these diagrams as non-material to the present disclosure. The feeler is mounted in a holder 28 reversibly, to permit of contact with either side of a tooth, and the holder is pivoted to carriage 17 at a point 29 and is acted upon by springs, here represented in a diagrammatic manner at 30 and 31, adapted to place it in a neutral position and in contact with the curved surface being tested. Either spring may be disconnected or otherwise made inactive, if desired.

The recording means of this invention is combined with a testing machine of the type thus illustrated, as follows. A strip of paper 32 on which the records are made passes from a supply roll 33 over a guide 34, around a drive roll 35 and over a table 36, emerging from an opening in the side of the machine. An arm 37 extends over the table 36 and carries a marking instrument 38 on its extremity bearing on the paper. Such marking instrument may be a pen of any of the types commonly used with recording gauges, and will be hereinafter referred to as a pen without limiting intent. The shaft of drive roll 35 carries a coaxial gear 39 in mesh with a coaxial gear 40, which latter meshes in turn with a gear 41. The last two gears are supported by a holder 42 pivoted on the machine base structure to swing about the axis of roll 35 and are arranged so that swinging of said holder in one direction or the other will place either one alone in mesh with a transmission gear 43. The last named gear is mounted on the same shaft 44 with a gear 45 which meshes with a gear segment 46 secured to the spindle 10. By means of this mechanism the paper is propelled through distances proportional to the angular movements of the spindle; and by placing one or the other of the gears 40 and 41 exclusively in mesh with gear 43, the paper may be propelled in the same direction when the spindle is rotated in opposite directions.

Figure 2:
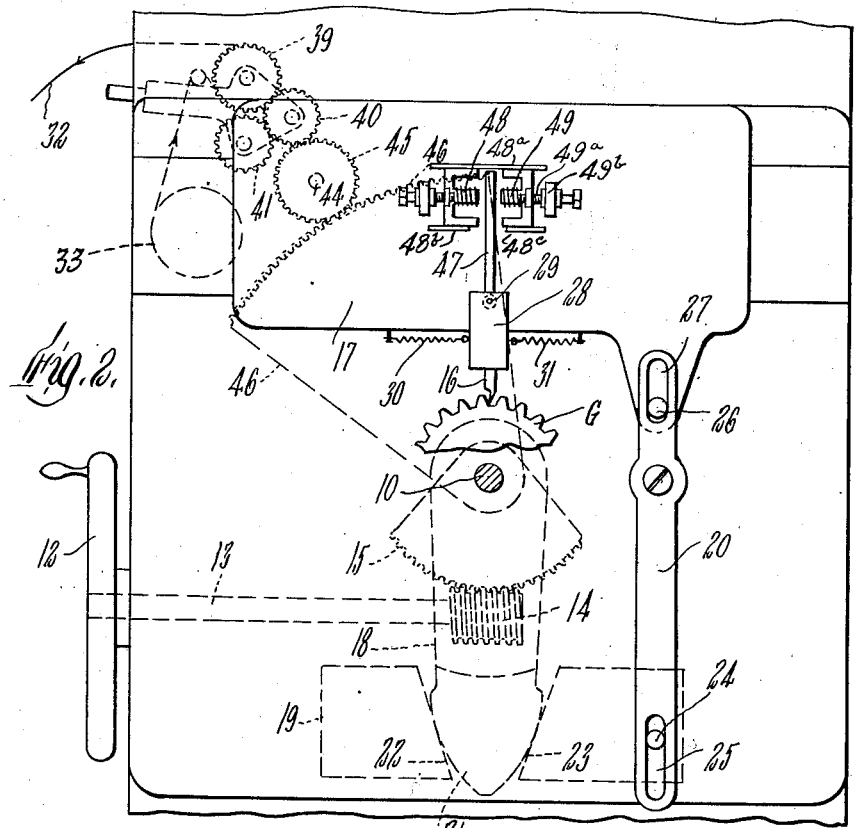
Fig. 2 is a diagrammatic front elevation of the essential mechanical equipment of the combined machine.
Figure 3:
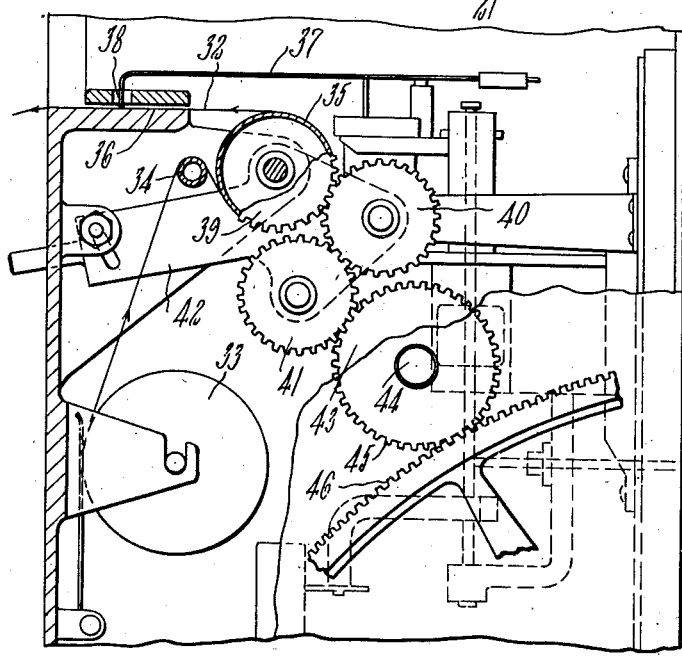
Fig. 3 is a partial section of the machine showing the mechanism by which the record chart is propelled through distances proportional to the movement of the piece being tested.

The feeler holder 28 carries an arm 47 of magnetic metal which projects between two coils of electrically conductive wire 48 and 49 which surround cores of magnetic metal in holders which are likewise of magnetic metal. Said coils will be designated and subsequently referred to as gauge coils. The arm 47 is the armature of the magnetic circuits of the gauge coils 48 and 49 and is separated from both by air gaps. Said coils and cores are adjustable in a manner to vary the width of the air gaps between them and the armature for purposes later described. One of many possible means for so adjusting them is shown in Fig. 2. Here the coil holders are mounted slidingly between guides 48a, 48b and 48c on the carriage 17 extending tangentially of the arcs in which adjacent points of the armature 47 swing. Each of the holders is in threaded engagement with an adjusting screw 49a, which is mounted rotatably, and withheld from endwise movement, in a lug 49b; the arrangement being such that by rotation of either screw the coil controlled thereby can be moved nearer to or farther from the armature. The coils are connected in circuit with two windings 50 and 51 in series connection on the same core of a transformer 52, which windings are arranged so as to oppose one another. The coils and windings constitute an alternating current bridge circuit analogous to a Wheatstone bridge. For descriptive purposes, the windings 50 and 51 are called the balancing coils of this bridge.

Power at constant voltage is supplied to the bridge by one of the secondary windings of a power transformer 53, through conductors 54 and 55 connected to the bridge terminals 56, between the gauge coils, and 57, between the balancing coils. The primary of the power transformer receives alternating current from any convenient power source through a constant voltage transformer 58.

A change in the air gaps between the gauge coils and armature, due to the movement of the latter, changes the reluctance of the magnetic circuits so that the voltages across the coils are varied. Movement of the armature in either direction shortens one air gap and lengthens the other, causing an increase of voltage across the coil which it approaches and a decrease of voltage across the coil from which it recedes. This results in a varying net voltage across the series-connected balancing coils 50 and 51, which increases as the armature is moved in one direction, and decreases as it is moved in the opposite direction, from a prescribed starting or zero position, and the intensity of which varies in proportion to the extent of movement of the armature.

The net voltage across the coils 50 and 51 is applied to the grid of a two part vacuum tube 59 having an amplifier section and a rectifier section. The amplifier section is connected with the primary winding 60p of a transformer 60, the secondary winding 60s of which is connected to apply voltage to the rectifier section of tube 59.

The rectified or direct voltage, variable in accordance with the position of armature 47, is applied through a resistance 61 to a circuit in which an indicator 62 is connected. A branch circuit, also connected with the vacuum tube and indicator and containing a series of resistors, one of which, designated 63, is variable, is subjected to a constant direct voltage obtained from the power transformer 53 and rectified by a vacuum tube rectifier 64. The indicator 62, a direct current ammeter, is connected, substantially as shown, so as to measure the difference between the variable voltage governed by the position of armature 47 and the constant voltage across the variable resistance 63. This variable resistance may be adjusted to alter the value of the constant voltage and current applied to the indicator, sufficiently to place the index of the indicator at zero throughout some range of armature movement. This enables the indicator to be set at zero when the armature is in a position to cause a net voltage across the coils 50 and 51. There are also connected in the indicator circuit a rheostat 65 and a resistance 66, the former of which is adjustable to vary the sensitivity of the indicator.

It is preferred to construct or adjust the apparatus so that when the feeler is in its neutral or radial position, (i, e., the position with respect to its carrier which it occupies when brought into contact with the starting point of an involute curve, and would maintain throughout the testing range of a perfect involute), there will be an unbalance in the bridge circuit and net voltage will exist across the coils 50 and 51. This is because of the high quality of accuracy required and the requirement to make the amplified movements of the indicator pointer proportional to movements of the feeler. It has been found that if the voltage across these coils is held above and at the same side of zero voltage throughout the tolerable range of movement of the feeler, there is virtually an exactly proportional relation between the feeler movement and the reading of the indicator; but that this relation does not hold when the bridge circuits are exactly or nearly balanced. This condition of permanent unbalance may be obtained by mounting or adjusting the gauge coils and armature so that the armature is nearer to one coil than the other when the feeler is in radial or mid position. Then the net voltage which affects the indicator is increased or decreased by movement of the feeler in one direction or the other from its central position. But by providing the indicator with a scale having a zero point in the middle and numbers running in both directions from zero, and by adjusting the indicator hand so that it reads zero when the feeler is in mid position, the indicator is made to show whether errors detected in the curve being measured are high or low with respect to the true curve.

Most of the voltage measured by the indicating instrument exists across the resistance 66. This resistance is a rheostat having a movable brush or tap by which a selected proportion of the resultant voltage is applied to the grid of a vacuum tube amplifier 67. The last named amplifier is connected as part of one leg of a direct current bridge, with which the rectifier 64 is connected as an additional source of power at direct voltage. A current meter 68, which operates the recording pen arm 37, is connected with the direct current bridge through a shiftable connection with a resistance 69 (forming a rheostat) in one side of its circuit, and a switch 70 in the other side. The parts of the resistance 69 at opposite sides of the shiftable meter connection are in different legs of the bridge, wherefore adjustment of this rheostat shifts the position of the pen arm by altering the initial unbalance of the bridge circuit. Rheostat 66 controls the sensitivity of the recording instrument by adjusting the amount of variable voltage which is applied to the amplifier 67.

The capacity for adjustment of the position of the marker afforded by rheostat 69 is an important feature of the invention, because it enables a number of records to be made in locations beside one another on the same chart.

Figure 4:
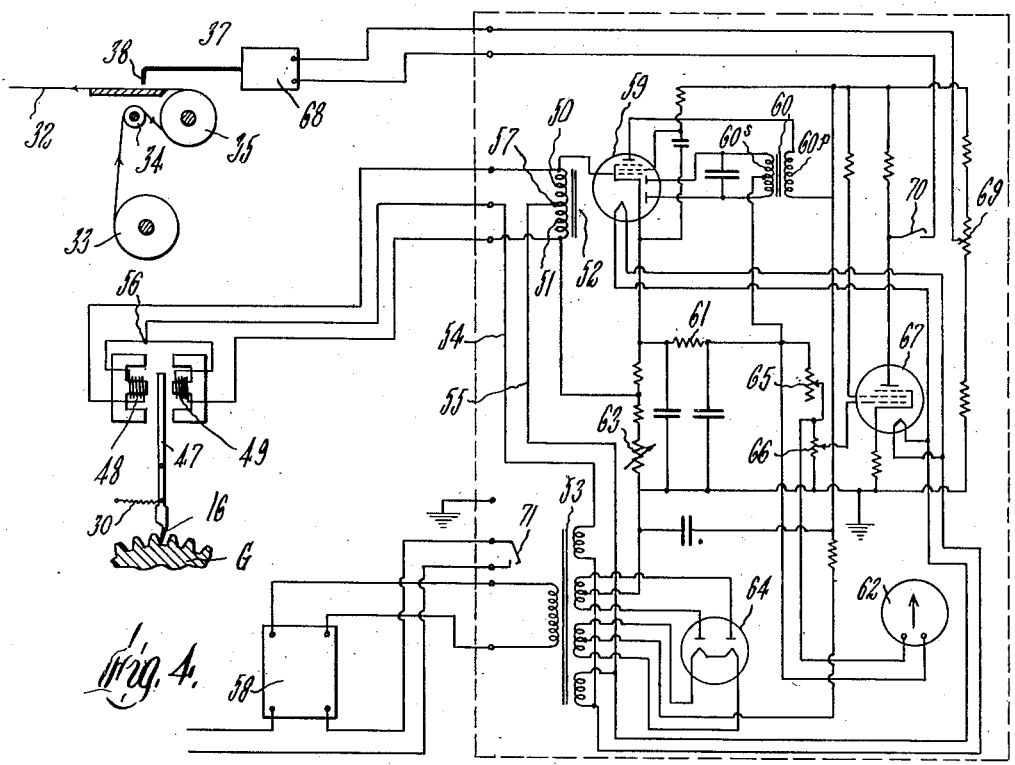
Fig. 4 is a diagram of the electrical equipment of the combined machine.

A switch 71 is connected in the circuit of the primary winding of the constant voltage transformer 58. This switch enables the entire indicating and recording apparatus to be put into or out of action and is called the power switch. Switch 70 in the circuit of the recording motor element, enables that element to be rendered inactive while the indicator 62 remains in operation alone. The external handles for operating these switches and the position adjusting rheostats are shown in Fig. 1 and are designated by the same reference characters applied to the related switches and rheostats in the diagram Fig. 4.

The elements of electrical equipment used here are or may be standard meters, vacuum tubes and other parts obtainable in the open market. A mode of connecting them in electrical circuits suitable for operation in accordance with the foregoing description and for obtaining the desired effects is shown in the diagram Fig. 4 with sufficient particularity to instruct those skilled in the electrical arts without further verbal explanation. The same principles may be embodied in other forms and combinations, wherefore it is to be understood that this diagram and the preceding explanation are illustrative and not limiting with respect to the scope of protection herein sought.

In making measurements of gear teeth, the test gear is adjusted on the spindle 10 with a tooth face in contact with the extremity of the feeler and the armature in an off center position between the gauge coils sufficiently to insure a net voltage across the balancing coils 50—51. The indicator adjuster 63 is or may be adjusted to bring the indicator to zero. After such adjustments have once been made for one tooth of a given gear, the indicator may be used thereafter without readjustment to determine when the other teeth of the gear have been brought into correct position for testing. The recording pen is adjusted by means of rheostat 69 to draw its record on any selected portion of the width of the record sheet.

The test gear is then rotated in the proper direction by hand wheel 12, and the record sheet is propelled under the pen at a rate proportional to the angular movement of the gear, by the gear train 46—45—43—41—40—39, or 46—45—43—40—39, according to the direction in which the spindle is rotated. If the tooth face is a true involute, no change in the position of armature 47 with respect to the gauge coils 48 and 49 will occur, wherefore the pin will inscribe a straight line on the chart. But any deviation or  ughness of the tooth face will affect the feeler, causing the armature to move toward one gauge coil and away from the other, with the result of increasing or  .reasing the net voltage which affects the instruments and causing the indicator hand and marker to shift in one direction or the opposite direction.

Figure 5:
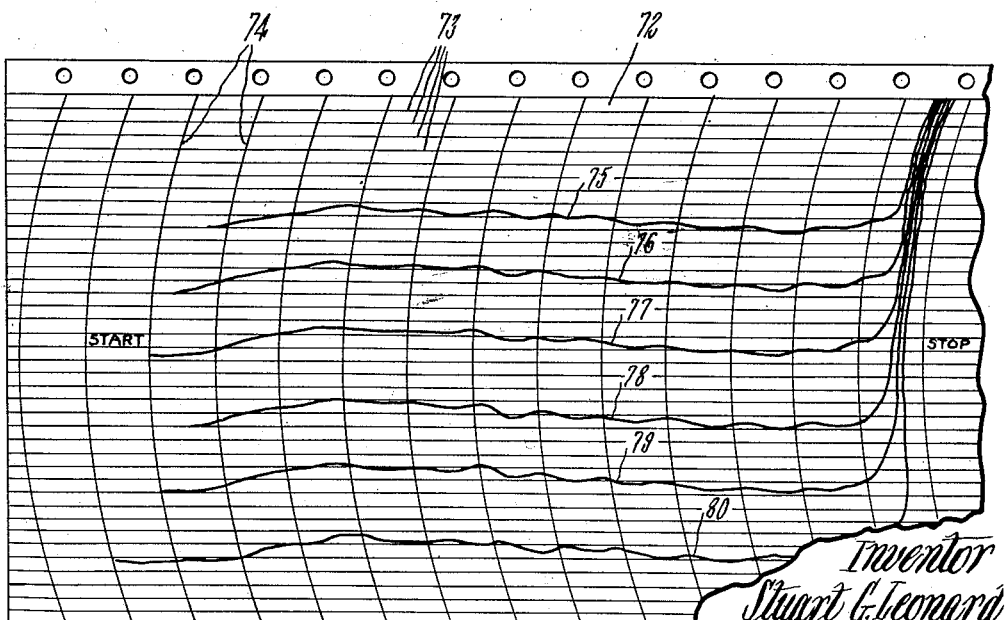
Fig. 5 is a plan view of a chart bearing records of gear tooth measurements made with the aid of the combined machine.

Fig. 5 shows a chart 72 made by my recording apparatus. The parallel lines 73 on the chart are reference lines spaced equal distances apart to measure movements of the feeler on an enlarged scale. In the chart here shown, th  spacing between them is .1" and each space represents a movement of the feeler of .0002". The transverse curved lines 74 correspond to the path of the pen across the paper when the latter is stationary and are spaced apart by the distance through which the paper travels when the spindle turns through a given angle, in this illustration 3°. The irregular lines 75, 76, 77, 78, 79 and 80 are records made by the pin while different teeth were moved past the feeler. In making these records, the chart was moved back to the starting point preliminary to the measurement of each successive tooth, and the pen was shifted by the position adjusting rheostat to a different location on the sheet. The capacity for thus shifting the pen enables different teeth to be readily compared. In connection with provisions for moving the feeler, or shifting the gear, so that the feeler may successively bear on different points in the length of the same gear tooth, it also enables possible errors in different parts of the same tooth face to be studied and compared. The cross lines 74 show the locations on the tooth faces of recorded errors.

In this measuring apparatus the recording meter with its marking instrument is both an indicator and a recorder. Its indicating function is similar to that of the indicator 62. But the latter is more than a mere duplication of the recording element. It is also a means for giving a check on the accuracy of the recorder. Being free from possible vitiating factors, such as frictional drag of the pen on the paper, to which the recorder is subject, the indicator gives accurate indications at all times and informs the attendant whether or not adjustments of the pen arm (as by reducing the frictional drag of the pen), are needed to enable the latter to give equally accurate indications. Another useful function of the indicator is to serve as a limit gauge by provision of markings on its scale showing the limits within which the errors of a curve must lie to pass inspection.

Variations and modifications from the specific equipment here shown may be made within the scope of the invention. For instance, by using larger gauge coils and more sensitive current meters than those used in the equipment illustrated, one or both stages of amplification for the recording indicator may be eliminated. Further, by making the gauge coils adjustable in position, and shifting them with respect to the armature, the location of the marking pen on the paper and the position of the indicator hand with respect to its scale, may be shifted without the use of the adjusting rheostats. However, the rheostats as adjusting means are simpler and more readily manipulated than mechanical adjustment of the coils. And the rectifier 64 is not an essential feature. It is provided, and the current to both the recorder and the indicator is rectified, because meters for direct current can be made with uniform scales, whereas in alternating current meters the movements of the index elements are not equal with equal increments of current strength. It is of advantage to have the measurement provisions of the record chart equally spaced; and particularly so where, as in this case, provisions are made for drawing records side by side in the same length of the sheet. But for uses where such equality of reference line spacing is not important the rectifying means and step may be omitted. Other arrangements of gauge coils and armatures are within the scope of my invention and of the protection here sought.

The utility of the invention is not limited to the recording of measurements of gear teeth only. It may be used for the like purpose in measuring involute curves of other machine elements, and indeed for making records of the characteristics of other surfaces than those of involute curvature, in situations where a relative movement between the part being measured and the feeler element takes place and a record sheet can be moved in a given path through distances bearing a given relationship to such relative movement; or where a marker may be so traversed in relation to a record sheet.

What I claim and desire to secure by Letters Patent is:

1. An apparatus for indicating and recording the condition of surfaces comprising means for supporting and moving an article of which the surface is to be tested, a record chart, means for propelling said chart in a given path simultaneously with, and through distances proportional to, movements of the test piece, a feeler for engagement with the test piece arranged to be moved by aberrations of said surface, an armature carried by said feeler and movable by and with the same, gauge coils located adjacent to, but separated from, said armature across the path of movement thereof so that the armature, when moved by the feeler, approaches one coil and recedes from the other, balancing coils and a source of alternating current connected with said gauge coils to form bridge circuits, an ammeter connected to be influenced by voltage changes consequent upon the variation in the magnetic relationship between said armature and gauge coils due to said movements of the armature, and a marker operated by said ammeter arranged to bear on the record chart and to be movable transversely of the travel of the chart.

2. An indicating and recording apparatus as set forth in claim 1 combined with adjusting means for causing engagement of the marker with the record chart in different locations crosswise of the line of travel of the chart.

3. An indicating and recording apparatus as set forth in claim 1, combined with a rheostat in the circuit of said ammeter operable to shift the position of the marker with respect to the record sheet crosswise of the path of travel thereof.

4. In combination with a gear testing machine having a feeler for engagement with the face of a gear tooth and for independent movement by aberrations in such face, a record sheet, means for propelling said sheet through distances proportional to the angles of rotation of the gear being tested, an ammeter having a marker engaged with said sheet and being movable crosswise of the direction of travel of the sheet, an armature carried by the feeler, gauge coils in an alternating current bridge circuit arranged with respect to said armature for causing variation of the reluctance of the magnetic circuit of said coils when the armature is so moved by the feeler, and connections for conducting current to said ammeter, such current being of varying intensity proportional to variations in voltage across the gauge coils caused by shifting of the armature.

5. The combination set forth in claim 4, and further including current amplifying means interposed between the bridge circuit and said ammeter.

6. An apparatus for indicating and recording the condition of surfaces comprising means for supporting an article of which the surface is to be tested, a feeler for engagement with the test piece, a holder for said feeler on which the feeler is mounted with provision for movement toward and away from the surface of the test piece, means for effecting relative movement between the test piece and said holder such that the feeler is, in effect, shifted over the surface of the test piece, a record chart, means for propelling said chart in a given path simultaneously with, and through distances proportional to, the relative movements between the test piece and feeler holder, an armature carried by said feeler and movable by and with the same, gauge coils located adjacent to, but separated by air gaps from, said armature across the path of movement thereof so that the armature, when moved by the feeler, approaches one coil and recedes from the other, balancing coils and a source of alternating current connected with said gauge coils to form bridge circuits, means for adjusting said gauge coils relatively to the armature so as to change the width of the air gaps, and thereby control the position of the after-mentioned marker with respect to the record chart transversely of the travel path thereof, a current responsive instrument connected to be influenced by voltage changes resulting from variations in the magnetic relationship between said armature and gauge coils, and a marker operated by said instrument arranged to bear on the record chart and to be movable transversely of the travel of the chart.

7. In combination with a gear testing machine having a feeler for engagement with the face of a gear tooth and means for effecting relative translation between such feeler and gear tooth in a manner to cause traverse of the feeler along and in contact with such face, the feeler being movable independently of said relative movement by aberrations in such face; a record sheet, means for propelling said sheet simultaneously with and in a given ratio to the before mentioned relative traversing movement between the feeler and gear tooth, an electric current meter having a marker engaged with said sheet, which marker is movable crosswise of the direction of travel of the sheet, an armature carried by the feeler, gauge coils in an alternating current bridge circuit arranged with respect to said armature so as to cause variations of the reluctance of the magnetic circuits of said coils when the armature is moved to vary its distances from the respective coils, and connections for conducting current to said meter, such current being of varying intensity proportional to variations in voltage across the gauge coils caused by shifting of the armature.

STUART G. LEONARD.